United States Patent
Chin et al.

(10) Patent No.: US 9,028,131 B2
(45) Date of Patent: May 12, 2015

(54) METHOD AND APPARATUS FOR HIGH INTENSITY ULTRASONIC TREATMENT OF BAKING MATERIALS

(75) Inventors: Ling Nyuk Chin, Serdang (MY); Ching Mei Tan, Serdang (MY); Nasrul Fikry Che Pa, Serdang (MY); Yus Aniza Yusof, Serdang (MY)

(73) Assignee: Universiti Putra Malaysia, Serdang (MY)

( * ) Notice: Subject to any disclaimer, the term of this patent is extended or adjusted under 35 U.S.C. 154(b) by 0 days.

(21) Appl. No.: 13/878,002
(22) PCT Filed: Oct. 5, 2011
(86) PCT No.: PCT/MY2011/000223
§ 371 (c)(1),
(2), (4) Date: Apr. 5, 2013
(87) PCT Pub. No.: WO2012/047092
PCT Pub. Date: Apr. 12, 2012

(65) Prior Publication Data
US 2013/0189407 A1 Jul. 25, 2013

(30) Foreign Application Priority Data
Oct. 5, 2010 (MY) .............................. PI 201004677

(51) Int. Cl.
*A21C 1/00* (2006.01)
*A21D 6/00* (2006.01)
(Continued)

(52) U.S. Cl.
CPC ... *A21D 6/00* (2013.01); *A21C 1/02* (2013.01); *B01F 11/0283* (2013.01); *A21C 14/00* (2013.01)

(58) Field of Classification Search
CPC ... B08B 3/12; B01J 19/10; B01J 2219/00283; B01F 11/0266; B01F 11/0283; A61H 23/0245; A21D 6/00
USPC ................................................ 366/127, 114
See application file for complete search history.

(56) References Cited

U.S. PATENT DOCUMENTS
2,937,292 A * 5/1960 Welkowitz et al. ........... 310/325
3,357,684 A * 12/1967 Kunnen ........................ 366/114
(Continued)

FOREIGN PATENT DOCUMENTS
EP 1878512 1/2008

OTHER PUBLICATIONS
Leadley et al., "Pulsed Electric Field Processing, Power Ultrasound and Other Emerging Technologies" in Food Processing Handbook, Brennan, J.G. ed., Wiley-VCH Verlag GmbH & Co. KGaA, Weinheim, Germany 2006 Chapter 7, pp. 215, 216, and 218, copyright 2006.
(Continued)

*Primary Examiner* — Tony G SooHoo
(74) *Attorney, Agent, or Firm* — Cesari and McKenna, LLP

(57) ABSTRACT

The present invention discloses a high intensity ultrasonic treatment method and apparatus that is used in conjunction with an existing commercial dough or batter mixer to enhance the rheological, aeration and textural properties of the dough or batter. This change in properties is a result of the phenomenon of acoustic cavitation induced in the dough or batter by treatment with high intensity ultrasonic waves. The present invention discloses a mixing bowl (20) of an existing mixer system that is preloaded with dough or batter, the bowl (20) is located at the center of an ultrasonic bath tank (101) filled with a working fluid. The effect of ultra-sonic waves with power levels above 1 kW can be observed over the entire or partial mixing period of the dough or batter. The ultra-sonic waves of the present invention are generated by a plurality of ultrasonic wave generators (104A, 104B) and piezoelectric transducers (1) mounted on a stainless steel tank (101). The electrical energy received in each transducer (1) will be converted into appropriate mechanical expansion and contractions in the piezoelectric ceramics of the transducer (1) thus leading to pressure waves being transmitted to the dough or batter to be mixed. The generation and transmission of high intensity ultrasonic waves to the dough or batter affects its rheological, aeration and textural properties.

6 Claims, 5 Drawing Sheets

(51) Int. Cl.
*B01F 11/02* (2006.01)
*A21C 1/02* (2006.01)
*A21C 14/00* (2006.01)

(56) References Cited

U.S. PATENT DOCUMENTS

| | | | | |
|---|---|---|---|---|
| 3,499,436 A * | 3/1970 | Balamuth | | 601/2 |
| 3,499,437 A * | 3/1970 | Balamuth | | 601/2 |
| 3,550,586 A * | 12/1970 | Balamuth | | 601/2 |
| 3,585,991 A * | 6/1971 | Balamuth | | 601/2 |
| 3,661,660 A * | 5/1972 | Wessells et al. | | 430/309 |
| 3,790,079 A * | 2/1974 | Berglund et al. | | 239/3 |
| 4,223,243 A * | 9/1980 | Oliver et al. | | 313/268 |
| 4,227,817 A * | 10/1980 | Gerry | | 366/127 |
| 4,525,219 A * | 6/1985 | Jones | | 134/1 |
| 4,527,901 A * | 7/1985 | Cook | | 366/127 |
| 4,555,302 A * | 11/1985 | Urbanik | | 216/90 |
| 4,653,543 A * | 3/1987 | Brown | | 139/1 C |
| 4,763,677 A * | 8/1988 | Miller | | 134/105 |
| 4,787,394 A * | 11/1988 | Ogura | | 600/439 |
| 4,870,982 A * | 10/1989 | Liu | | 134/135 |
| 4,942,868 A * | 7/1990 | Vago | | 601/2 |
| 5,048,520 A * | 9/1991 | Vago | | 601/2 |
| 5,086,810 A * | 2/1992 | Carroll | | 139/1 C |
| 5,339,804 A * | 8/1994 | Kemp | | 601/2 |
| 5,347,665 A * | 9/1994 | Kumon et al. | | 4/541.1 |
| 5,472,005 A * | 12/1995 | Campbell | | 134/186 |
| 5,484,573 A * | 1/1996 | Berger et al. | | 422/128 |
| 5,597,003 A * | 1/1997 | Campbell | | 134/184 |
| 5,702,353 A * | 12/1997 | Guzzini et al. | | 601/2 |
| 5,711,327 A * | 1/1998 | Fields | | 134/105 |
| 5,736,100 A * | 4/1998 | Miyake et al. | | 422/64 |
| 5,834,871 A * | 11/1998 | Puskas | | 310/316.02 |
| 6,002,195 A * | 12/1999 | Puskas | | 310/325 |
| 6,433,460 B1 * | 8/2002 | Puskas | | 310/317 |
| 6,914,364 B2 * | 7/2005 | Puskas | | 310/316.03 |
| 6,946,773 B2 * | 9/2005 | Puskas | | 310/316.01 |
| 2002/0171331 A1 * | 11/2002 | Puskas | | 310/328 |
| 2004/0159790 A1 | 8/2004 | Thompson et al. | | |
| 2004/0182414 A1 * | 9/2004 | Puskas | | 134/1 |
| 2006/0207329 A1 | 9/2006 | Page et al. | | |
| 2007/0102020 A1 | 5/2007 | Shiotsuki et al. | | |
| 2009/0129197 A1 * | 5/2009 | Isidorov | | 366/127 |
| 2009/0223809 A1 * | 9/2009 | Penrose et al. | | 204/158.21 |
| 2014/0027305 A1 * | 1/2014 | Myers | | 205/646 |

OTHER PUBLICATIONS

Dobraszczyk et al., "Baking, Extrusion and Frying" in Food Processing Handbook, Brennan, J.G. ed., Wiley-VCH Verlag GmbH & Co. KGaA, Weinheim, Germany 2006 Chapter 8, pp. 242 and 244, copyright 2006.

* cited by examiner

METHOD AND APPARATUS FOR HIGH INTENSITY ULTRASONIC TREATMENT OF BAKING MATERIALS

CROSS REFERENCE TO RELATED APPLICATIONS

This application is a National Stage of International Application No. PCT/MY2011/000223 filed on Oct. 5, 2011, which claims priority to Malaysian Application No. PI 2010004677 filed Oct. 5, 2010, the contents of which are hereby incorporated by reference in their entirety.

The present invention relates to the treatment of baking material such as dough and batter for baking bread and cakes with high intensity ultrasonic waves. The present invention improves the overall mixing quality of dough and batter through the introduction of rheological, aeration and textural changes during the mixing stage of the dough and batter.

BACKGROUND TO THE INVENTION

Ultrasonics is a branch of acoustics dealing with vibratory waves at frequencies above the average human hearing range, i.e., frequencies over 20 kHz. In contrast, sound waves with frequencies in the range of 20 Hz to 20 kHz are in the audible range, whereas sound waves with frequencies below 20 Hz are in the infrasonic range. An ultrasonic wave is longitudinal, travels as concentric hollow spheres and causes a series of compressions and expansions of the molecules in the medium surrounding it as it propagates. It can be used in various engineering applications.

Ultrasonics is a trade term coined by the Ultrasonic Manufacturers Association and used by its successor, the Ultrasonic Industry Association, to refer to the use of high-intensity acoustic energy to change materials. This usage is contrasted to ultrasound, which is generally reserved for imaging, as in sonar, materials examination, i.e. non destructive inspection (NDI), and diagnostics (mammography, doppler bloodflow, etc.). However, in spite of this distinction, much technical material on ultrasound imaging actually uses the term ultrasonics.

Ultrasonication offers great potential in the processing of liquids and slurries, by improving the mixing and chemical reactions in various applications and industries. Ultrasonication generates alternating low-pressure and high-pressure waves in liquids, leading to the formation and violent collapse of small vacuum bubbles. This phenomenon is termed cavitation and causes high speed impinging liquid jets and strong hydrodynamic shear-forces. These effects are used for the deagglomeration and milling of micrometer and nanometer-size materials as well as for the disintegration of cells or the mixing of reactants. In this aspect, ultrasonication is an alternative to high-speed mixers and agitator bead mills. Ultrasonic foils under the moving wire in a paper machine will use the shock waves from the imploding bubbles to distribute the cellulose fibres in a more uniform manner in the produced paper web, which will thus culminate in the making of a stronger paper with a more even surface profile. Furthermore, chemical reactions benefit from the free radicals created by the cavitations as well as from the energy input and the material transfer through boundary layers. For many processes, this sonochemical effect leads to a substantial reduction of the reaction time, like in the transesterification of oil into biodiesel. Ultrasonication can easily be tested in lab scale for its effect on various liquid formulations. Equipment manufacturers have developed a number of larger ultrasonic processors of up to 16 kW power. Therefore volumes from 1 mL up to several hundred gallons per minute can be sonicated today in order to achieve all kinds of results.

The low-intensity ultrasonic waves, typically <1 W cm$^{-2}$ are non-destructive where it will never change the physical or chemical state of the medium due to its small power level. This non-invasive technology has been applied in quality assessment and provides information about physicochemical properties, such as composition, structure, physical state and flow-rate.

The application of high intensity ultrasonic waves, typically in the range 10-1000 Wcm$^{-2}$ can cause physical disruption of a material or promote certain chemical reactions. High intensity ultrasound has been used in various applications ranging from cell disruption, modification and control of crystallization processes, enzyme deactivation, meat tenderization, enhancement of oxidation and ultrasonic mixing.

In general, ultrasonic technology has been widely used for mixing purposes in the industry.

US20090168591 discloses an ultrasonic mixing system for mixing particulate including rheology modifiers, sensory enhancers, pigments, lakes, dyes, abrasives, absorbents, anti-caking, anti-acne, anti-dandruff, anti-perspirant, binders, bulking agents, colorants, deodorants, exfoliants, opacifying agents, oral care agents, skin protectants, slip modifiers, suspending agents, warming agents and combinations thereof into formulation in a treatment chamber.

JP2006045445 discloses an ultrasonic synthesizing unit being used in the manufacturing system of synthetic oil mixed with metal powder.

CN1343670 discloses a process for synthesizing organo-silicon monomer by direct mixing silicon powder with catalyst powder in liquid phase ultrasonic mixer to uniformly disperse the catalyst powder on the surface of silicon particle.

U.S. Pat. No. 5,059,309 teaches a continuous ultrasonic flotation unit which permits a mixture to be ultrasonically agitated as it is passed through a small mixing chamber.

EP2059336 discloses an ultrasonic treatment chamber in a mixing system used to form a liquid solution by mixing together two or more components.

EP1489667 discloses a method for a backside surface passivation of solar cells comprising a mixing system with stirring and ultrasonic treatment.

Mixing is a key step during the production of dough based products, which allows for the flour, water, and other ingredients if present, such as salt, chemical leavening agents, and/or yeast to be assimilated thereby forming a. coherent mass. It has been noted that air is also an important ingredient incorporated during mixing as it often goes unmentioned as an ingredient. The presence of air bubbles attribute to the taste sensation and the mouth-feel of food making it important in food assortments. The creation and control of aerated structures in cereal-based food such as bread, cakes and biscuits is the key to mastering the manufacture of these products as they gain their distinctive appeal from their aerated structure. Sonication is the commonly used method for micro-bubble generation besides mechanical agitation to manufacture aerated structures in these cereal based food products.

SUMMARY OF THE INVENTION

In one aspect the present invention provides a high intensity ultrasonic treatment apparatus for enhancing the mixing of baking material for bread and cakes such as dough or batter. The apparatus of the present invention is integrated with a pre-existing dough or batter mixing apparatus to thus enhance the mixing of said dough or batter by introducing rheological, aeration and textural changes during the mixing process, the apparatus comprising of:

an ultrasonic bath tank which contains a plurality of piezoelectric flange mounted type transducers wherein a predetermined number of transducers are mounted on the outside sides of the tank and on the inside bottom surface of the tank, such that the transducer blocks affixed on the inside bottom surface of the tank are positioned adjacent to one another on opposing sides of the tank structure;

a mounting frame assembly that has a fixed bottom frame and a moveable top frame, the frame assembly is used to support the ultrasonic bath tank and thus isolate the tank from the surface of a floor to ensure proper propagation of the generated ultrasonic waves into a target area;

a pair of ultrasound generators used to generate high intensity ultrasonic waves of more than 1 KW power levels; and a control panel assembly that contains circuitry to regulate the operation of the pair of ultrasound generators connected to the ultrasonic bath tank via the plurality of piezoelectric flange type ultrasonic transducers.

In another aspect, the present invention provides a method for enhancing the rheological, aeration and textural properties of baking dough and batter. More specifically, the method comprises of treating the dough or batter with high intensity ultrasonic waves by placing the dough or batter within a mixing bowl of a pre-existing mixing apparatus and immersing the bowl in an ultrasonic bath tank that is in direct contact with the generated ultrasonic waves.

The present invention enhances the rheological property of dough or batter by enabling the viscosity of the dough or batter to be varied according to the intensity of the ultrasonic waves used to treat the dough or batter. The viscosity of the dough or batter depends on the ingredients used in said dough or batter.

The present invention enhances the aeration of a dough or batter by utilizing high intensity ultrasonic waves to thus ultrasonically induce bubble activity inside a baking dough or batter due to pre-existing gaseous inclusions to thus cause the implosion and formation of bubbles that introduce and further exaggerate aeration within the baking or batter medium.

The present invention enhances the textural properties of dough or batter by utilizing high intensity ultrasonic waves to cause shrinkage of bubbles to occur due to protein denaturation that is in turn the result of acoustic cavitation. The partially unfolded protein molecules generated from surface protein denaturation associate to form a stabilizing film around the bubbles. The surface of the bubbles present, become denser and hence apparently very rigid resulting in the change of the textural properties of the dough or batter that has been treated.

DETAILED DESCRIPTION OF THE INVENTION

Figure 1:
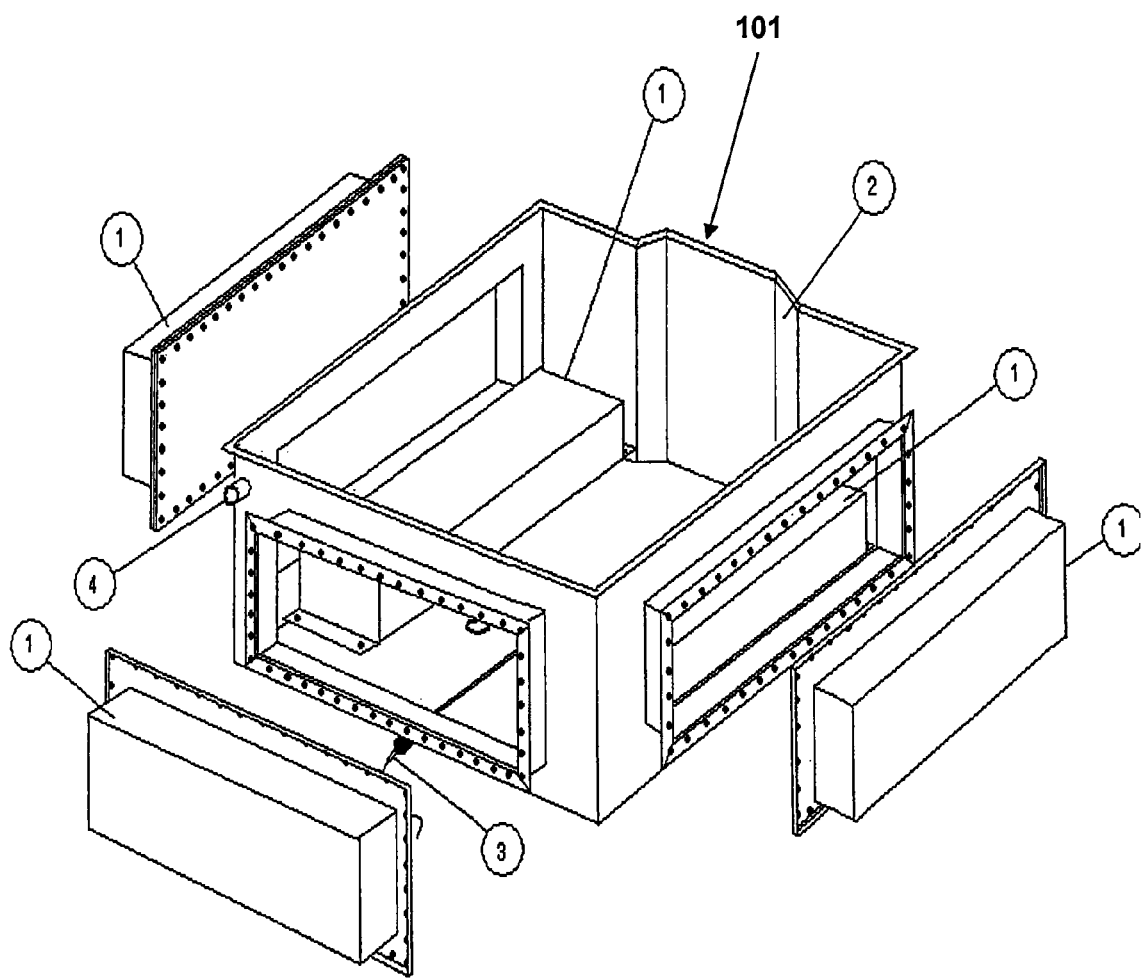
FIG. 1 is an exploded view of a bath tank used in conjunction with the high intensity ultrasonic treatment apparatus of the present invention.

The detailed description set forth below in connection with the appended drawings is intended as a description of exemplary embodiments and is not intended to represent the only forms in which these embodiments may be constructed and/or utilized. The description sets forth the functions and the sequence for constructing the exemplary embodiments. However, it is to be understood that the same or equivalent functions and sequences may be accomplished by different embodiments that are also intended to be encompassed within the scope of this disclosure.

With reference to FIGS. 1 to 6, the apparatus of the high intensity ultrasonic bath 301 for treatment of baking materials such as dough and batter used in the baking of bread and cakes of the present invention will now be described in detail. More particularly FIGS. 1 to 5 will be used to describe the apparatus of afore-mentioned high intensity ultrasonic bath 301 for enhancing the mixing of dough and batter by treatment with high intensity ultrasonic waves whereas FIG. 6 will be used in conjunction with FIGS. 1 to 5 to describe the operation of said high intensity ultrasonic bath 301.

The present invention is a high intensity ultrasonic bath 301 for enhancing the mixing of dough and batter by treatment with high intensity ultrasonic waves, that is integrated with a pre-existing dough and batter mixing apparatus 20, 21, 22 and 24 to thus enhance the mixing of said dough and batter by introducing rheological, aeration and textural changes during the mixing process comprising of:

an ultrasonic bath tank 101;

a mounting frame assembly 102;

a pair of ultrasound/ultrasonic wave generators 104A, 104B used to generate high intensity ultrasonic waves of 1.5 KW and 1 KW power levels respectively; and a control panel assembly 103 that contains circuitry to regulate the operation of the pair of ultrasound generators 104A, 104B connected to the ultrasonic bath tank 101 via the plurality of piezoelectric flange type ultrasonic transducers 1 of the present invention.

The ultrasonic bath tank 101 of the present invention is a generally rectangular formed tank fabricated from stainless steel 316L. The tank 101 has four sides, three of which are open. The open sides of the tank 101 are rectangular shaped openings that have flanges protruding from all four sides. Each flange of a particular opening has a plurality of perforations that serve to aid in the securing of a flange mount type ultrasonic transducer 1. Each of the previously mentioned three sides, are respectively connected to three flange mount type ultrasonic transducers 1. Each flange mount type transducer 1 has the general shape of a rectangular cube with perforated flanges on all four of its sides that are further lined with a rubber lining (for water-proofing purposes). The flanges of the flange mount type transducers 1 and the flanges of the rectangular openings of the ultrasonic bath tank 101 act in cooperation such that, when the ultrasonic flange mount transducers 1 are mounted, the perforations of the open sides of the tank 101 and the perforations of the transducers 1 are in alignment to thus allow the ultrasonic transducers 1 to be secured in place with the aid of appropriate bolts and nuts.

Two other similar ultrasonic flange mount transducers 1 are mounted on the inside bottom surface of the ultrasonic bath tank 101 of the present invention. Each transducer 1 is oriented such they are placed facing down, adjacent to each other by a predetermined distance and are further oriented longitudinally and occupy symmetrically opposing sides of the inside bottom face of the tank 101.

Each ultrasonic flange transducer 1 has a power output of 500 Watts and actually consists of a plurality of ceramic piezoelectric ultrasonic transducer elements (not shown) that are capable of producing oscillations of 25 KHz. Each piezoelectric transducer element comprises of i.) Piezoelectric ceramics to convert received electrical energy into appropriate mechanical oscillations.
ii.) Two electrode plates to receive positive and negative electrical supply
iii.) A back plate and front driver plate that act to generate a stable ultrasonic vibration and thus transmit the generated ultrasonic wave to the tank's 101 inside bottom surface and the water that, the tank 101 holds.

The base of the ultrasonic bath tank 101 has an opening in the front as indicated in FIG. 1 that serves as a provision to mount a temperature probe 3, such that the temperature probe 3 is oriented longitudinally along the center line of the base of the tank 101.

Figure 5:
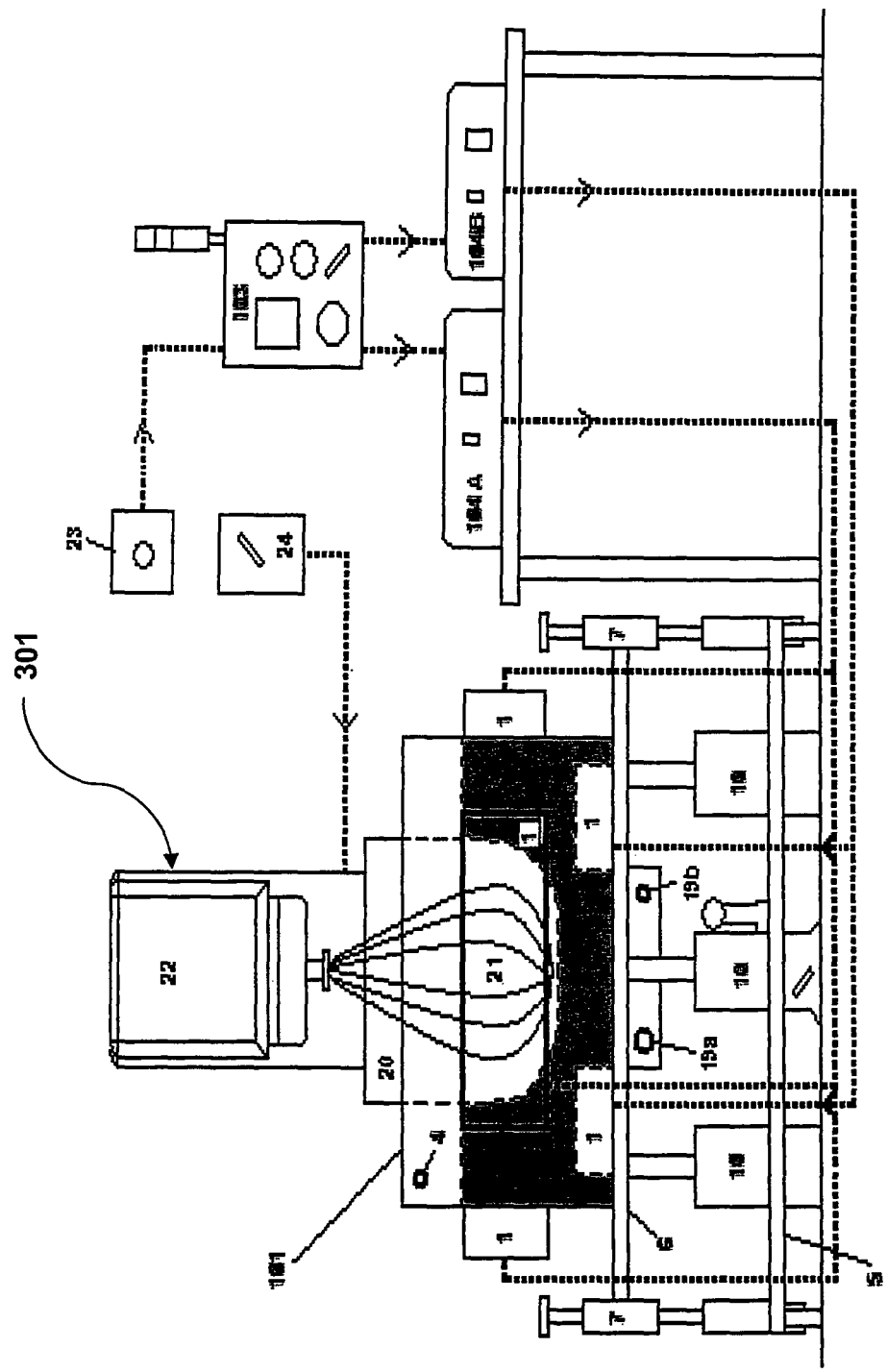
FIG. 5 is a diagram illustrating the setup of the high intensity ultrasonic treatment apparatus of the present invention.

With reference to FIG. 5, the ultrasonic bath tank 101 of the present invention has, an overflow outlet 4 to maintain the water level in the tank 101 to a predetermined level, above which the overflow outlet 4 will come into operation, and divert excess water out of the tank 101. Apart from the overflow outlet 4, the tank 101 also has a water inlet valve 19a and a drain valve 19b as indicated in FIG. 5. The water inlet valve 19a is used to couple via a suitable coupling means to a suitable water supply source to thus fill the ultrasonic bath tank 101 of the present invention. The drain valve 19b on the other-hand is used to drain water from the tank 101 after use.

Figure 2:
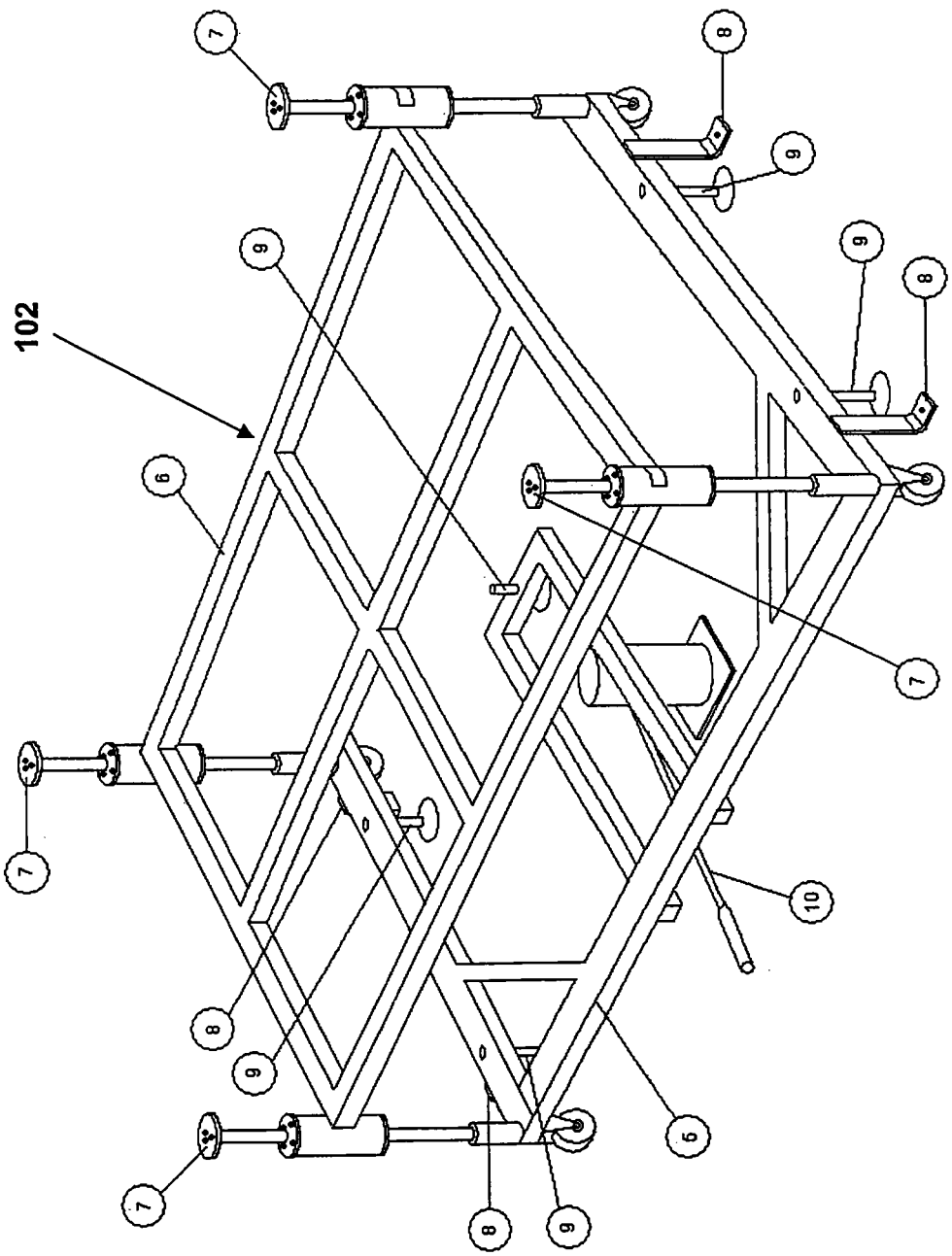
FIG. 2 is a perspective view of a mounting frame assembly used to support the bath tank.
Figure 3:
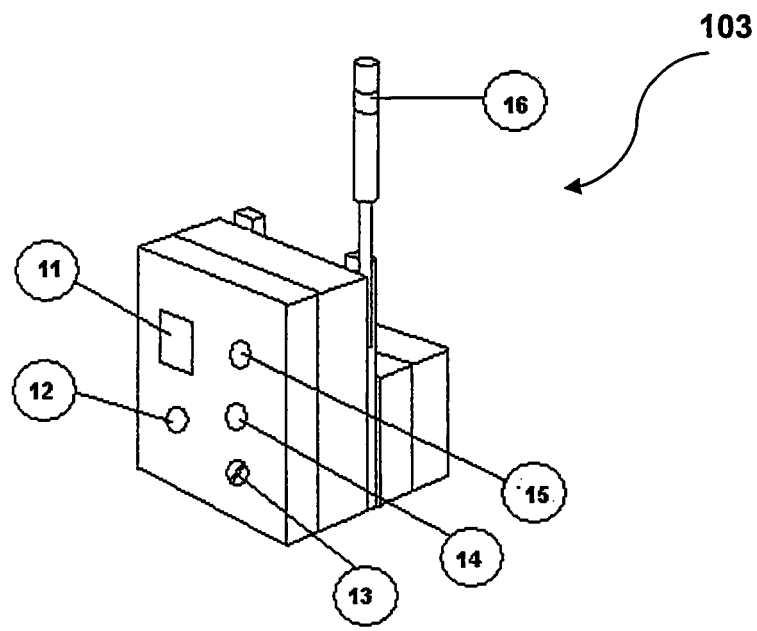
FIG. 3 is a perspective view of a control panel used in the high intensity ultrasonic treatment apparatus of the present invention.
Figure 4:
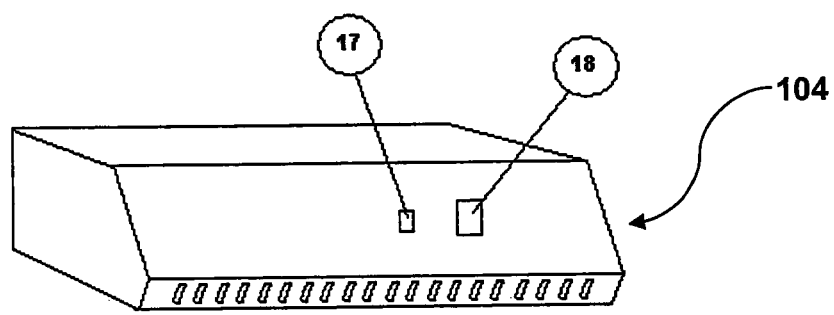
FIG. 4 is a perspective view of a high intensity ultrasonic wave/ultrasound generator used in the high intensity ultrasonic treatment apparatus of the present invention.

With reference to FIGS. 1, 2 and 5 the ultrasonic bath tank 101 of the present invention, is mounted atop a similarly fabricated stainless steel 316L mounting frame assembly 102. The mounting frame assembly 102 comprises of a lower frame 5 that is fixed in position to a predetermined height level above the ground reference level and a moveable upper frame 6.

The height of the lower frame 5 that is fixed in position to a predetermined height level with reference to the ground level, this height level is determined by the length of the leveling stand 9 or length of the of the bolt down bracket 8. The moveable upper frame 6 incorporates four linear bearings located at the four corners of said upper frame 6. The combination of the lower frame 5 and moveable upper frame 6 are supported by four column structures that incorporate a frame stopper 7 as depicted by FIG. 2. The entire mounting frame assembly 102 is provided with four casters to render the tank 101 and mounting frame assembly 102 of the present invention a certain measure of portability. A plurality of hydraulic jacks 10 are placed at the bottom of the mounting frame assembly 102 to enable the lifting of the ultrasonic bath tank 101 of the present invention to a predetermined level so as to ensure that the ultrasonic vibration produced by the plurality of flange mounted ultrasonic transducers 1 are not affected by the reflection of waves due to the interface of the tank 101 and the ground. The mounting frame assembly 102 thus serves to provide a measure of physical isolation between the ground level and the tank 101 to ensure that the ultrasonic waves produced by the plurality of ultrasonic flange mounted transducers 1 are not affected by interference.

The moveable upper frame 6 of the mounting frame assembly 102 of the present invention is adjusted to the height level that the ultrasonic bath tank 101 has been elevated to by the plurality of hydraulic jacks 10 such that the tank's 101 outside bottom surface rests on and is hence supported by the upper face of the moveable upper frame 6.

As has been previously mentioned, the mounting frame assembly 102 of the present invention has four leveling stands 9 and four corresponding bolt down brackets 8. The distribution of the bolt down brackets 8 and the leveling stands 9 are as illustrated in FIG. 2. The stands 9 serve the purpose of ensuring the ultrasonic bath tank 101 and hence mounting frame assembly 102 is at a zero degree angle with respect to an imaginary line that is perfectly horizontal. The leveling stands 9 can be adjusted by either screwing in the clockwise or anticlockwise direction. The leveling is presumably done with the aid of a water level device. Once the mounting frame assembly 102 and the mounted ultrasonic bath tank 101 of the present invention has been determined to be properly leveled, the bolt down brackets 8 are lowered on to the ground and subsequently secured to the ground by an appropriate means.

With reference to FIGS. 1, 3, 4 and 5 the pair of ultrasonic wave/ultrasound generators 104A, 104B of the present invention act to generate appropriate electrical signals i.e. signals with frequencies above 20 KHz, more particularly in a preferable embodiment of the present invention, the ultrasonic frequencies generated equate to 25 KHz. The electrical signals with the required frequency and power levels for a particular application that are generated by the pair of ultrasound generators 104A, 104B of the present invention are respectively transmitted with the aid of appropriate RF cables to the flange mount type ultrasonic transducers 1 that are mounted around and inside the ultrasonic bath tank 101. In a preferable embodiment of the present invention, the electrical signal generated from the ultrasound generator 104A corresponds to an ultrasonic signal with a power level of 1.5 KW and the electrical signal generated from the ultrasound generator 104B corresponds to an ultrasonic signal with a power level of 1 KW.

The electrical power required to drive the electronic circuitry of the ultrasound/ultrasonic wave generators 104A, 104B of the present invention are tapped from the control panel 103. The pair of ultrasound generators 104A, 104B have built in, electronic control circuitry that ensure the signals generated by the ultrasound generators 104A, 104B are maintained at the desired frequency and power level. The signal generators 104A, 104B have disposed on their anterior surfaces an ON/OFF switch 17 and a High/Low power level switch 18. The ON/OFF switch 17 of the respective ultrasound generators 104A, 104B serve to enable and disable electrical power supplied via the control panel 103 to the respective generators 104A, 104B. The High/Low power level switch 18 serves to permit the selection of two sweep rates. The low level corresponds to, in a preferred embodiment of the present invention, 80 sweep cycles/second and the high level corresponds to, 1000 sweep cycles/second. The sweep circuitry is a circuitry designed into the ultrasound generators 104A, 104B of the present invention. The variation of the sweep selection causes the signal sent to the flange mount ultrasonic transducers 1 of the present invention to vary slightly in frequency. This variation corresponds to a particular preselected sweep rate. The purpose of varying the sweep cycles/second is to distribute the energy of the irradiated ultrasonic waves radiated from the flange mounted ultrasonic transducers 1 in a uniform manner throughout the ultrasonic bath tank 101.

With reference to FIGS. 1 to 5, the entire set-up of the ultrasonic bath tank 101, the mounting frame assembly 102 and the pair of ultrasound generators 104A and 104B as described in the preceding paragraphs is controlled from signals generated by the control panel 103. The control panel 103 has 3 outputs, two of which are connected to the ultrasound generators 104A, 104B. The third output is connected to the temperature probe 3.

The control panel 103 has disposed on its anterior face, a temperature control display and setting console 11, a timer switch 12, a main power on/off button 13, a start button 14, a stop button 15 and a tower light indicator 16. The temperature control display and setting console 11 provides a means to the operator of the present invention to control the temperature of water inside the ultrasonic bath tank 101. When the temperature probe 3 registers a temperature inside the ultrasonic bath tank 101 that is at a level above the pre-set set-point, the registered temperature will be electrically fed back to the control panel 103 which then cuts off or reduces the power supplied to the ultrasound/ultrasonic wave generators 104A, 104B. The timer switch 12 is presumably a rotary switch with a radial indication of the required duration of operation of the present invention located around the circumference of the switch 12. The main power on/off button 13 serves to override the start button and stop buttons 14, 15. The start button 14 enables the pair of ultrasound generators 104A, 104B to begin the operation of generating the ultrasonic waves of the required power level to thus render the present invention operational. Conversely the stop button 15 cuts off the power to the pair of ultrasound generators 104A, 104B to thus render the present invention un-operational. When the temperature probe 3 registers a temperature inside the ultrasonic bath tank 101 that is at a level above the pre-set set-point, the registered temperature will be electrically fed back to the control panel 103 which then cuts off or reduces the power supplied to the ultrasound/ultrasonic wave generators 104A, 104B., simultaneously the control panel 103 will actuate the tower light indicator 16 to provide an indication of the over temperature registered to the operator.

The operation of the entire apparatus of the high intensity ultrasonic bath 301 will now be described with reference to FIGS. 1 to 6. Initially the ultrasonic bath tank 101 of the present invention is placed atop of the moveable upper frame 6 of the mounting frame assembly 102 and is jacked up to a predetermined height level with the aid of a plurality of hydraulic jacks 10. Once the ultrasonic bath tank 101 has been raised to the predetermined height level, the height of the upper moveable frame 6 with reference to the ground level is adjusted such that the outer bottom surface of the tank 101 rests on the top surface of the upper moveable frame 6.

Figure 6:
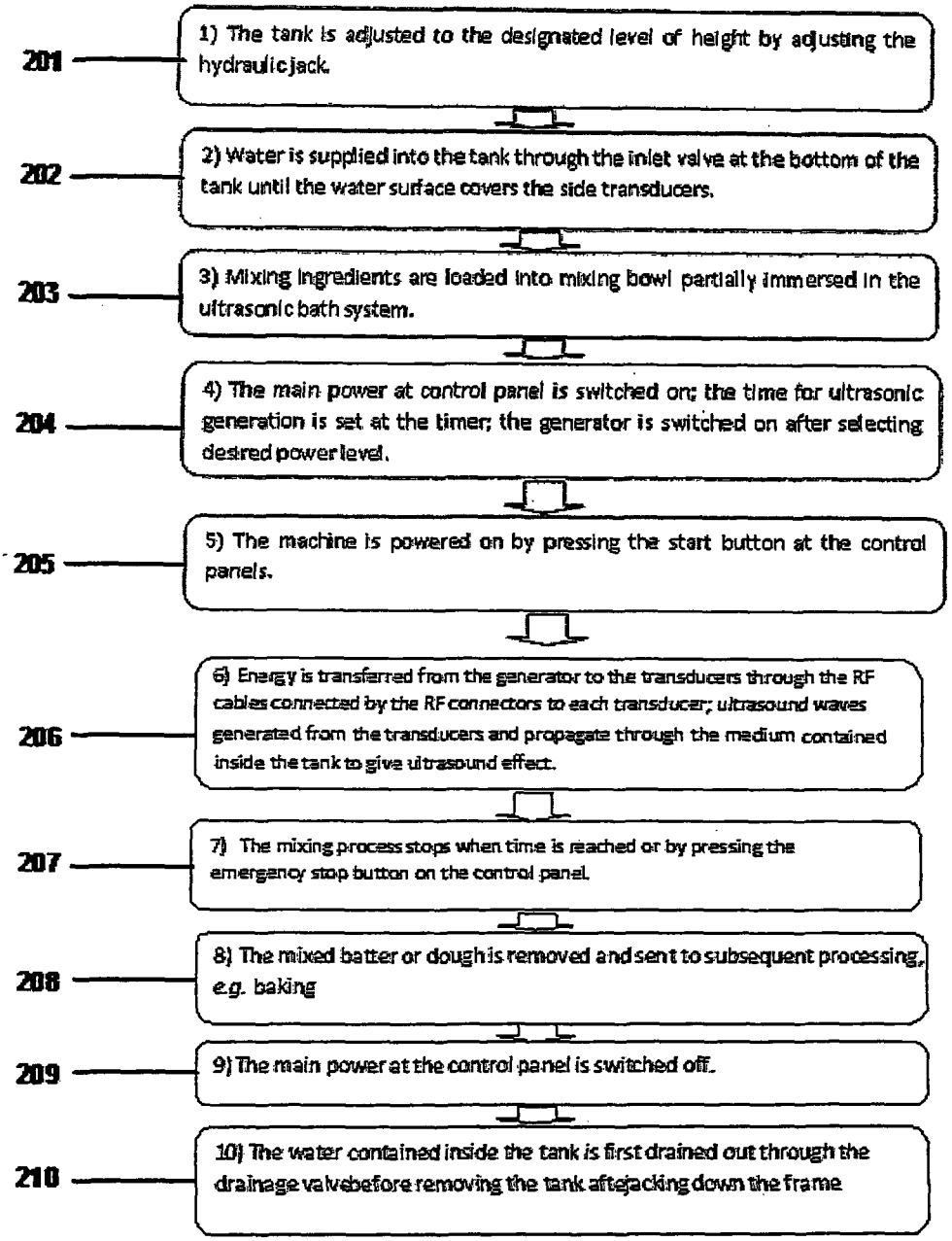
FIG. 6 is a block diagram illustrating the steps required to operate the apparatus of the present invention.

The actions described in the preceding paragraph, correspond to block 201 of FIG. 6. The subsequent step as embodied in block 202 consist of filing the ultrasonic bath tank 101 of the present invention via the water inlet valve 19a from an appropriate water source until the water level in the tank 101 is higher than the level at which the ultrasonic transducers 1 are positioned.

The next step, step 203 consists of positioning a dough or batter mixing apparatus comprising of a mixer 22 with a shaft coupled to a mixing blade 21 and a mixing bowl 20 such that the mixing bowl 20 is immersed in the water filled ultrasonic bath tank 101 as illustrated in FIG. 6. Subsequently, the dough or batter is loaded into the mixing bowl 20.

In step 204, the power to the mixer is turned on via the mixer on/off 24 switch. Subsequently, power to the control panel is supplied by actuating the mains 23, the timer switch 12 of the control panel 103 is set to a predetermined duration of time that ultrasonic waves are to be emitted to the dough or batter via the interface of the ultrasonic transducers 1 with the water in the tank 101 and hence to the mixing bowl 20. The desired power level of the ultrasonic waves to be emitted are preselected with the aid of the High/Low power level switch 18 disposed on the front face of the ultrasonic wave/ ultrasound generators 104A, 104B.

The next step 205, requires, the control panel 103 to be turned on via the main power on/off button 13 and the on/off switch 17 of the ultrasound generators 104A, 104B are turned to the "on" position.

In step 206, the ultrasound generators 104A, 104B will proceed to generate electrical signals at ultrasonic frequencies at predetermined power levels to the plurality of ultrasonic piezoelectric transducers 1 that are mounted around and in the ultrasonic bath tank 101. The transducers 1 will convert these electrical signals to acoustic waves with ultrasonic frequencies, in our case with waves with a frequency of 25 KHz. The ultrasonic waves generated are transmitted to the water contained in the tank 101 and subsequently the energy of the waves are transferred to the walls of the mixing bowl 20 and hence the material i.e., the dough or batter inside the bowl 20.

In step 207, once the preset time for ultrasonic treatment is reached, the control panel 103 cuts off power to the ultrasound generators 104A,104B and the ultrasonic treatment stops. The control panel 103 also cuts off power to the ultrasound generators 104A, 104B in the event of an over-temperature, i.e. a temperature above the preset set point temperature is registered by the temperature probe 3 and feeds this information back to the control panel 103.

In step 208, the mixed batter or dough is removed and sent to the subsequent food processing stage once power to the mixer has been cut off with the aid of mixer on/off switch 24. In 209, the mains 23 are switched off and in 210, the water contained in the tank is drained via the drain valve 19b.

The apparatus of the high intensity ultrasonic bath 301 for enhancing the mixing of dough or batter by treatment with high intensity ultrasonic waves, enhances the mixing of baking dough or batter by introducing rheological, aeration and textural changes to the baking dough or batter. More particularly the emission and transmission of high intensity ultrasonic waves to and hence impingement on a dough or predetermined amount of batter that is placed inside a mixing bowl 20 and that is in-turn placed in an ultrasonic bath tank 101 introduces a cavitation effect to the dough or batter. This cavitation effect is the formation, growth and in some cases implosion of micro-bubbles inside liquids. The implosion of bubbles leads to energy accumulations in hot spots where temperatures and pressure are high. The treatment of a particular medium such as baking dough or cake batter and the likes to ultrasonic waves of a predetermined intensity, can lead to the breaking up of molecules due to the cavitation effect, the generation of free radicals by water sonolysis and shear forces created by micro-streaming and shockwaves. These effects in turn lead to a change of viscosity of the liquid medium treated by the ultrasonic waves. Thus the dough or batter placed in the mixing bowl 20 and subsequently placed, in the ultrasonic bath tank 101 and consequently treated with high intensity ultrasonic waves will experience rheological changes, more particularly its viscosity will change.

In addition to the above, ultrasonically induced bubble activity inside the medium being treated with ultrasound, (i.e. acoustic cavitation) that contains pre-existing gaseous inclusions also provides aeration changes to the treated medium. More particularly, when the ultrasonic wave's amplitude increases and exceeds a certain level as it transits through the treated medium, the magnitude of the negative pressure in the areas of rarefaction will eventually become sufficient to cause the liquid to fracture and this thus leads to the formation of bubbles. During the negative pressure portion of the ultrasonic wave the previously formed bubbles will grow rapidly and thus enlarging the vacuum inside the bubbles. The bubbles will start to shrink under surface tension when the negative pressure is reduced and the atmospheric pressure is reached. Hence during ultrasonic treatment of a particular medium, the implosion and formation of bubbles will introduce and further exaggerate aeration within the medium. Thus the dough or batter placed in the mixing bowl 20 and subsequently placed in the ultrasonic bath tank 101 and consequently treated with high intensity ultrasonic waves will have a greater degree of aeration.

In addition, the treatment by ultrasonic waves of certain food material like bread dough for instance improves the textural properties of the final baked product. Research suggests that foams present in foamed food products give, a considerable positive taste sensation and mouth-feel.

More particularly when an aerated food medium is treated with ultrasonic waves, the shrinkage of bubbles occur due to protein denaturation that is in turn the result of acoustic cavitation. The partially unfolded molecules generated from protein surface denaturation associate to form a stabilizing film around the bubbles. The surface of the bubbles present become denser and hence apparently very rigid resulting in the change of aeration and textural properties of the medium treated. Thus the dough or batter placed in the mixing bowl 20, wherein the combination of the dough or batter and mixing bowl 20 is subsequently placed in the ultrasonic bath tank 101 and consequently treated with high intensity ultrasonic waves will result in said dough or batter having better textural properties.

Hence, when baking materials such as dough or batter is treated with ultrasonic waves, 1.) Its viscosity can either increase or decrease depending on the intensity of the ultrasonic waves it is treated with, wherein the acoustic cavitation cause localized hot spots, the production of free radicals through water sonolysis and shear forces created by micro-streaming and shock waves, break up molecules in the baking dough and batter. This thus introduces rheological changes to the baking dough or batter that is treated with ultrasonic waves.

2.) The dough or batter will have better aeration through the formation and implosion of bubbles due to the ultrasonic cavitation effect.

3.) The dough or batter will have better textural properties due to protein denaturation resulting from ultrasonic cavitation, wherein the partially unfolded protein molecules will form a stabilizing film around the bubbles present in the baking dough or cake batter ensuring the surface to be denser and more rigid.

Thus in the high intensity ultrasonic mixing system of the present invention, the rheological, aeration and textural properties of baking materials such as dough or batter placed in a mixing bowl 20 that is in turn placed in the ultrasonic bath tank 101 and treated with high intensity ultrasonic waves, is improved.

EXAMPLE

By way of example, now will be described a comparative test between a conventional mixing and mixing enhanced by the use high intensity ultrasonic waves as disclosed in the present invention, with two types of aerated products. The formulations used in test samples for baking dough and cake batter are as tabulated in Table 1.

TABLE 1

| Ingredient | Dough Baker % | Dough Mass (g) | Batter Baker % | Batter Mass (g) |
|---|---|---|---|---|
| Flour | 100 | 1500 | 100 | 450 |
| Sugar | 6 | 90 | 130 | 585 |
| Salt | 1.5 | 22.5 | 0.85 | 3.9 |
| Water | 63 | 945 | 55 | 247.4 |
| Yeast | 1.5 | 22.5 | 162.5 | 731.2 |
| Shortening | 5 | 75 | 162.5 | 731.2 |
| Baking powder | | | 8 | 36 |
| Emulsifier | | | 9.2 | 41.4 |
| Whole eggs | | | 162.5 | 731.2 |
| Corn starch | | | 75 | 337.4 |
| Total | | 2655.0 | | 2432.3 |

Results for dough-properties were found prominently positive when mixed at 2.5 kW for the entire mixing duration of 40 minutes. Ultrasound exposure produced dough with lower dynamic density and consequently bread with lower density (14%) and firmness (32%). The duration of treatment to high intensity ultrasonic waves affected bread density more significantly while the ultrasonic power affected bread firmness more significantly.

Results for batter and cake properties were found prominently positive when mixed at 2.5 kW for the entire mixing duration of 9 minutes. Ultrasound exposure produced cake batter of lower density (2%) and flow behavior index, higher viscosity, overrun, and consistency index; resulting in cakes with higher springiness, cohesiveness and resilience in addition to lower hardness (12%).

The use of high intensity ultrasonic waves to treat the cake batter food specimen, resulted in the marked improvement of the properties of the resulting cake produced by the treated batter. It was observed that the duration of treatment is critical to creating positive changes and effects in the properties of cake batter.

The invention claimed is:

1. A high intensity ultrasonic treatment apparatus for enhancing the mixing of baking materials for bread and cakes such as dough or batter by enhancing the rheological, aeration and textural properties of the dough and batter, the ultrasonic apparatus is configured be integrated with a mixing apparatus, the ultrasonic treatment apparatus comprising:
    a bath tank having four sides with respective outer facing side surfaces and a bottom with an inside facing inner bottom surface;
    a mounting frame assembly;
    a pair of ultrasonic wave generators used to generate high intensity ultrasonic waves of more than 1 KW power levels respectively;
    a control panel assembly that contains circuitry to regulate the operation of the pair of ultrasonic wave generators connected to the bath tank via a plurality of piezoelectric transducers;
    the plurality of piezoelectric transducers being mounted on the outer facing side surfaces and the inner facing bottom surface of the bath tank.

2. A high intensity ultrasonic treatment apparatus according to claim 1, wherein the mounting frame assembly comprises a lower frame that is fixed in position and a moveable upper frame that is supported by a plurality of column structures.

3. A high intensity ultrasonic treatment apparatus according to claim 2, wherein the height of the moveable upper frame is adjustable.

4. A high intensity ultrasonic treatment apparatus according to claim 2, wherein the moveable upper frame supports the bath tank.

5. A high intensity ultrasonic treatment apparatus according to claim 2, wherein a vertical position adjustment of the moveable upper frame is maintained to a particular position with the aid of a plurality of frame stoppers that act to secure the position of the moveable upper frame.

6. A high intensity ultrasonic treatment apparatus according to claim 1, wherein the ultrasonic wave generators cooperate with the plurality of piezoelectric transducers to generate high intensity ultrasonic waves.

\* \* \* \* \*